(12) United States Patent
Brown (10) Patent No.: US 11,040,784 B2
(45) Date of Patent: Jun. 22, 2021

(54) ADJUSTMENT MECHANISM FOR A HOIST

(71) Applicant: C SERIES AIRCRAFT LIMITED PARTNERSHIP, Mirabel (CA)

(72) Inventor: William D. Brown, Wichita, KS (US)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 172 days.

(21) Appl. No.: 16/307,165

(22) PCT Filed: Jun. 5, 2017

(86) PCT No.: PCT/US2017/035919
§ 371 (c)(1),
(2) Date: Dec. 5, 2018

(87) PCT Pub. No.: WO2017/214021
PCT Pub. Date: Dec. 14, 2017

(65) Prior Publication Data
US 2019/0118977 A1  Apr. 25, 2019

Related U.S. Application Data

(60) Provisional application No. 62/346,191, filed on Jun. 6, 2016.

(51) Int. Cl.
*B64F 5/50* (2017.01)
(52) U.S. Cl.
CPC ...................... *B64F 5/50* (2017.01)
(58) Field of Classification Search
CPC ....................................... B64F 5/50
(Continued)

(56) References Cited

U.S. PATENT DOCUMENTS 2,744,552 A * 5/1956 Novick .................. B26D 7/025
269/221
6,105,937 A * 8/2000 Hay ............................. 254/237
(Continued)

FOREIGN PATENT DOCUMENTS

DE     102008060126 A1   6/2010
WO        2009126334 A2  10/2009

OTHER PUBLICATIONS

PCT International Search Report and Written Opinion dated Aug. 2, 2017, re: International Application No. PCT/US2017/035919.
(Continued)

*Primary Examiner* — Joseph J Hail
*Assistant Examiner* — Shantese L McDonald
(74) *Attorney, Agent, or Firm* — Norton Rose Fulbright Canada LLP (57) ABSTRACT

An adjustment mechanism for a lifting device includes a longitudinal clamp bar and a clamp slidably disposed on the clamp bar. The clamp has a clamp body and at least one clamping member movably connected to the clamp body. The at least one clamping member is operative for (1) acquiring a clamped condition when a lifting force is applied to the clamp body, wherein in the clamped condition, the at least one clamping member is engaged with the longitudinal clamp bar to prevent movement of the clamp along the clamp bar and (2) acquiring an unclamped condition when a lifting force is released from the clamp body, wherein in the unclamped condition, the clamp is free to move along the clamp bar.

22 Claims, 8 Drawing Sheets

(58) Field of Classification Search
USPC ...... 254/10 R, 237, 245, 247, 252, 253, 263
See application file for complete search history.

(56) References Cited

U.S. PATENT DOCUMENTS

| | | | | |
|---|---|---|---|---|
| 9,004,563 B2* | 4/2015 | Buzby | ...................... | A47F 13/06 |
| | | | | 294/115 |
| 2011/0265327 A1 | 11/2011 | West | | |
| 2013/0234382 A1* | 9/2013 | Hofmann | ................. | B23Q 3/06 |
| | | | | 269/20 |

OTHER PUBLICATIONS

English translation of patent document No. DE 102008060126 dated Jun. 10, 2010, https://patents.google.com/patent/DE102008060126A1/en?oq=de+102008060126, accessed on Dec. 3, 2018.

* cited by examiner

ADJUSTMENT MECHANISM FOR A HOIST

CROSS-REFERENCE TO RELATED APPLICATION(S)

The present application is a national phase application under 35 U.S.C. 371 of International Patent Application No. PCT/US2017/035919 filed on Jun. 5, 2017, which claims priority from U.S. Provisional Patent Application Ser. No. 62/346,191, entitled "ADJUSTMENT MECHANISM FOR A HOIST," filed on Jun. 6, 2016, the entire content of which is hereby incorporated by reference.

FIELD OF THE INVENTION

The present invention concerns a construction for an adjustment mechanism for a hoist that may be employed to lift a heavy object. More specifically, the present invention concerns an adjustment mechanism permitting adjustment of the hoist to accommodate different objects with differing centers of gravity. Even more specifically, the present invention concerns a quick adjustment mechanism that may be employed on a hoist constructed to lift a pylon for an aircraft.

DESCRIPTION OF THE BACKGROUND AND RELATED ART

As should be apparent to those skilled in the art, many modern jet aircraft include at least one turbine engine attached to each wing of the aircraft via a pylon.

At certain times, such as during maintenance or repair operations, the pylon must be removed from the aircraft. The pylon typically includes several lifting points so that the pylon may be attached to a hoist, permitting the pylon to be lifted and/or lowered with respect to the wing.

Once detached from the aircraft, the pylon is initially supported by the hoist. The pylon may be transferred from the hoist to a stand, as required or as desired.

As should be apparent to those skilled in the art, it is possible that the pylon may be removed from the aircraft with its associated systems. In one instance, for example, a pylon may be removed together with an internal pre-cooler. In another instance, the pylon may be removed without the pre-cooler or other systems included. Depending upon what components and/or systems are removed together with the pylon, the center of gravity of the pylon may change from one instance of removal to the next.

For many reasons, while the pylon is suspended from the hoist, it is desirable to hold the pylon in a substantially stable and balanced manner. Therefore, depending on the positioning of the pylon's center of gravity, hoist operators often are required to adjust belts and/or chains connected to the pylon to accommodate any changes in the center of gravity.

As may be apparent to those skilled in the art, manual adjustment of the belts and chains is difficult and time consuming and often requires extra tools that are not always readily available.

Accordingly, a need has developed for an adjustment mechanism for a hoist that permits a quick and simple adjustment to accommodate a pylon, where the center of gravity of the pylon may change depending upon the components associated therewith.

SUMMARY OF THE INVENTION

The present invention addresses one or more of the deficiencies with respect to the prior art.

Accordingly, the present invention provides for an adjustment mechanism for a lifting device. The adjustment mechanism includes a longitudinal clamp bar and a clamp slidably disposed on the clamp bar. The clamp includes a clamp body and at least one clamping member movably connected to the clamp body. The at least one clamping member is operative for (1) acquiring a clamped condition when a lifting force is applied to the clamp body, wherein in the clamped condition, the at least one clamping member is engaged with the longitudinal clamp bar to prevent movement of the clamp along the clamp bar and (2) acquiring an unclamped condition when a lifting force is released from the clamp body, wherein in the unclamped condition, the clamp is free to move along the clamp bar.

In one contemplated embodiment, the clamp body includes an upper clamp element and a lower clamp element movable in relation to each other.

In another contemplated embodiment, the upper clamp element includes a slot for receiving the at least one clamping member.

Still further, the present invention contemplates a construction where the at least one clamping member incorporates a pawl movable in relation to the upper clamp element via the slot.

It is contemplated that the longitudinal clamp bar may include a plurality of teeth and the at least one pawl comprises corresponding teeth, wherein in the clamped condition, the teeth of the at least one pawl engage with the teeth of the longitudinal clamping bar.

It is also contemplated that the upper clamp element may have two slots and that the at least one clamping member may encompass four pawls.

In yet another embodiment, the clamp bar includes a left clamp bar and a right clamp bar disposed on opposite sides of the upper clamp element and the lower clamp element.

Another embodiment contemplates that the at least one clamping member encompasses four pawls, the four pawls are arranged in pairs disposed on the opposite sides of the upper clamp element and the lower clamp element, a first pair of the pawls engages the left clamp bar, and a second pair of the pawls engages the right clamp bar.

Still further, the left clamp bar may be provided with a left toothed surface, the right clamp bar may have a right toothed surface, and the four pawls may include teeth complimentary to the left toothed surface and the right toothed surface.

The adjustment mechanism of the present invention is contemplated to be constructed so that the upper clamp element defines an eyelet for engaging a lifting device, the upper clamp element defines two slanted slots, a first shaft is slidably disposed in each slanted slot, connecting upper ends of two pawls together on opposite sides of the upper clamp element, the lower clamp element defines two upper openings at an upper end, and a second shaft is rotatably disposed in each opening, connecting lower ends of the two pawls together on opposite sides of the lower clamp element.

In another contemplated embodiment, the left and right clamp bars define grooves therein, the lower clamp element defines two lower openings at a lower end, and a third shaft is disposed in each lower opening, wherein the third shaft extends into the grooves, thereby slidably securing the clamp to the left and right clamp bars.

It is contemplated that a knob may be disposed on the clamp bar to secure the clamp bar against movement in a lateral direction.

The present invention also provides for a hoist that includes a frame and an adjustment mechanism disposed on the frame. The adjustment mechanism includes a longitudinal clamp bar and a clamp slidably disposed on the clamp bar. The clamp includes a clamp body and at least one clamping member movably connected to the clamp body. The at least one clamping member is operative for (1) acquiring a clamped condition when a lifting force is applied to the clamp body, wherein in the clamped condition, the at least one clamping member is engaged with the longitudinal clamp bar to prevent movement of the clamp along the clamp bar and (2) acquiring an unclamped condition when a lifting force is released from the clamp body, wherein in the unclamped condition, the clamp is free to move along the clamp bar.

The present invention also provides for a hoist where the clamp body comprises an upper clamp element and a lower clamp element movable in relation to each other.

Concerning the hoist, the upper clamp element may have a slot for receiving the at least one clamping member.

Also with respect to the hoist, the at least one clamping member is contemplated to encompass a pawl movable in relation to the upper clamp element via the slot.

In another contemplated embodiment of the hoist, the longitudinal clamp bar includes a plurality of teeth and the at least one pawl has corresponding teeth, wherein in the clamped condition, the teeth of the at least one pawl engage with the teeth of the longitudinal clamping bar.

The upper clamp element of the hoist may have two slots and the at least one clamping member may include four pawls.

It is contemplated that the clamp bar for the hoist may have a left clamp bar and a right clamp bar disposed on opposite sides of the upper clamp element and the lower clamp element.

The hoist of the present invention also may be constructed so that the at least one clamping member encompasses four pawls, the four pawls are arranged in pairs disposed on the opposite sides of the upper clamp element and the lower clamp element, a first pair of the pawls engages the left clamp bar, and a second pair of the pawls engages the right clamp bar.

Alternatively, the hoist may be constructed so that the left clamp bar comprises a left toothed surface, the right clamp bar comprises a right toothed surface, and the four pawls comprise teeth complimentary to the left toothed surface and the right toothed surface.

In the hoist of the present invention, the upper clamp element may define an eyelet for engaging a lifting device, the upper clamp element may define two slanted slots, a first shaft may be slidably disposed in each slanted slot, connecting upper ends of two pawls together on opposite sides of the upper clamp element, the lower clamp element may define two upper openings at an upper end, and a second shaft may be rotatably disposed in each opening, connecting lower ends of the two pawls together on opposite sides of the lower clamp element.

It is contemplated that the hoist may be constructed so that the left and right clamp bars define grooves therein, the lower clamp element defines two lower openings at a lower end, and a third shaft is disposed in each lower opening, wherein the third shaft extends into the grooves, thereby slidably securing the clamp to the left and right clamp bars.

Finally, the hoist may include a knob disposed on the clamp bar that secures the clamp bar against movement in a lateral direction.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
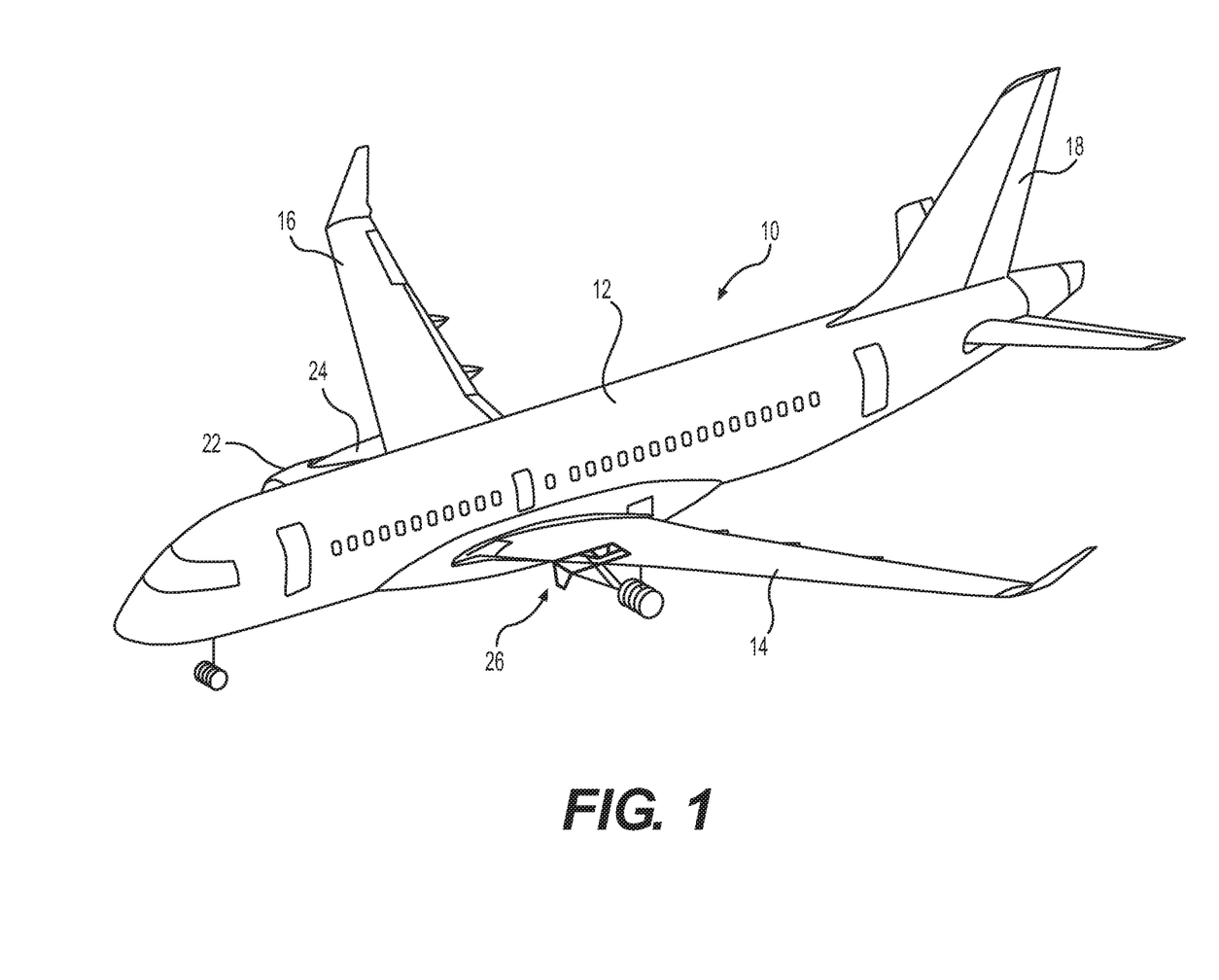
FIG. 1 is a perspective illustration of an aircraft, showing the location of a hoist with the adjustment mechanism of the present invention, the hoist being positioned near to the location of a pylon, which has been removed in this view.

FIG. 1 is a perspective illustration of a jet aircraft 10. The aircraft 10 includes a fuselage 12, a port wing 14, a starboard wing 16, and a tail section 18. A pylon 24 is attached to the starboard wing 16. The pylon 24 connects the engine 22 to the starboard wing 16, suspending the engine 22 beneath the starboard wing 16. With respect to the port wing 14, the associated pylon 24 has been removed. At roughly the location where the port pylon 24 would be located normally, a hoist 26 is illustrated.

Details of the hoist 26 are provided in connection with the discussion of FIGS. 4-8. By way of introduction of the adjustment mechanism of the present invention, the term "hoist" is used in the broadest sense of the word, meaning a device for lifting. Use of the term "hoist" is not intended to limit the scope of the present invention.

Figure 2:
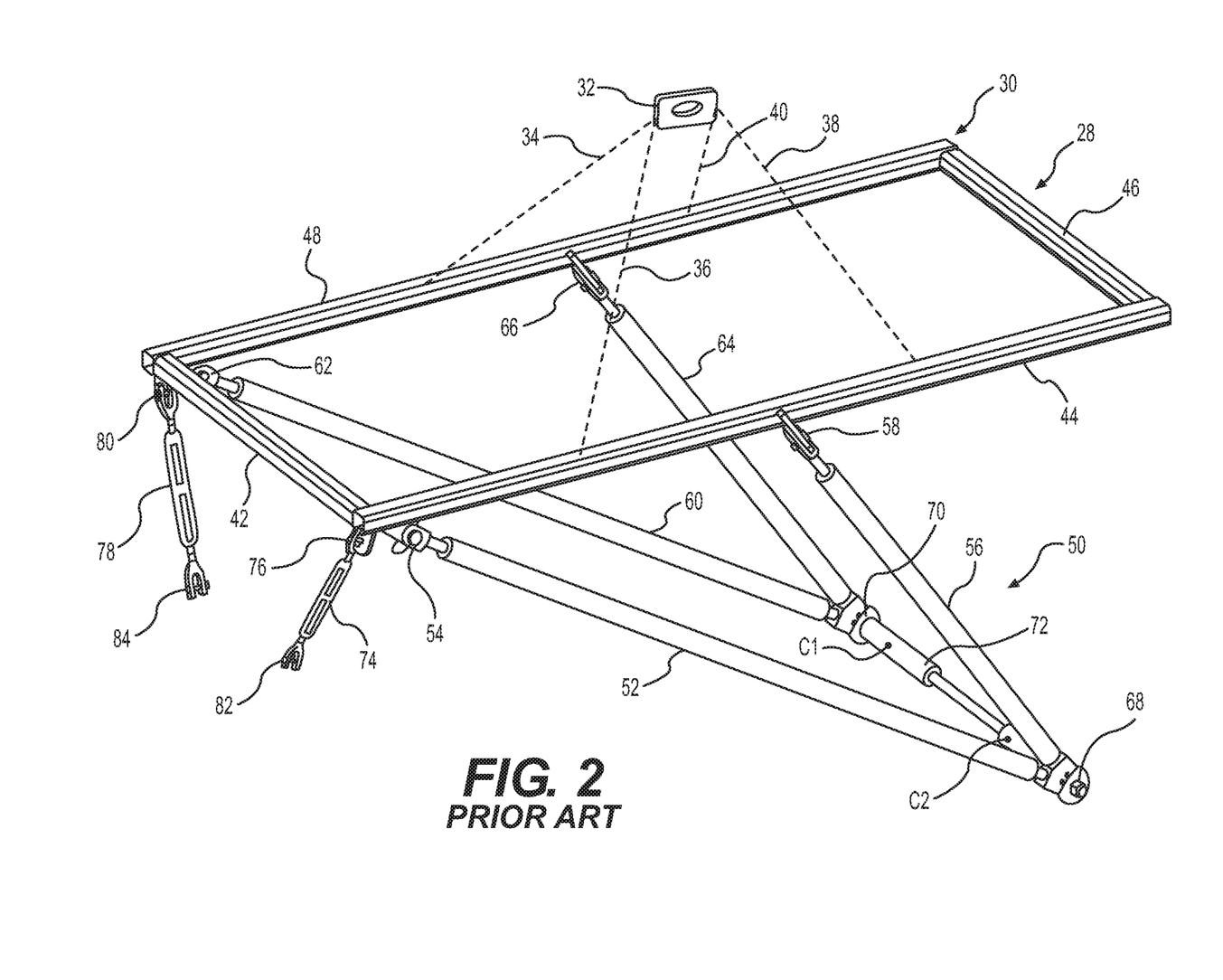
FIG. 2 is an perspective representation of a prior art configuration for a hoist for carrying a pylon.
Figure 3:
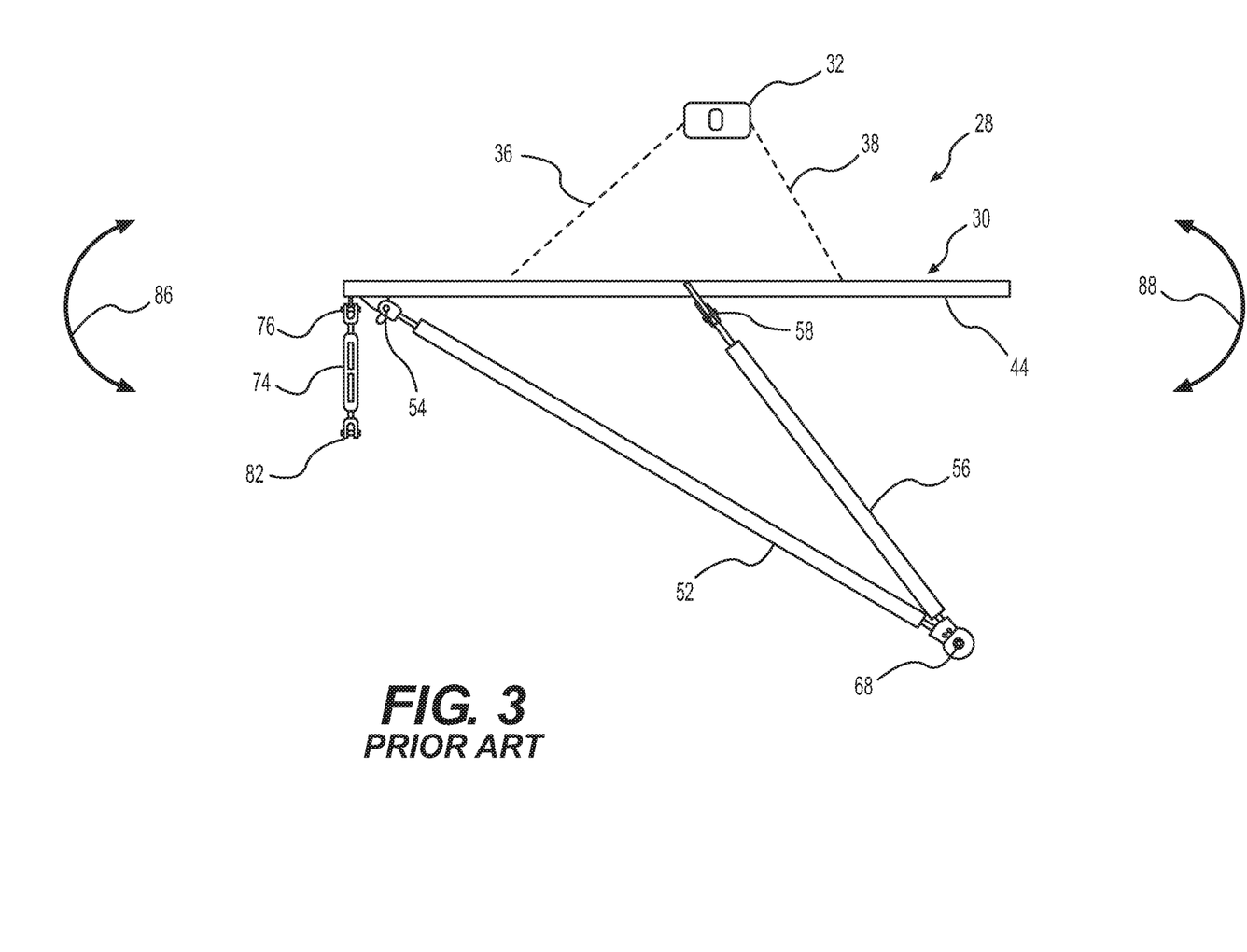
FIG. 3 is an elevational, side view representation of the prior art hoist shown in FIG. 2.

Before discussing aspects of the hoist 26, a brief discussion of a prior art hoist 28 is provided with respect to the illustrations in FIGS. 2-3. The discussion of the prior art hoist 28 is intended to assist with an understanding of selected features associated with the hoist 26 and the adjustment mechanism 90 of the present invention.

FIG. 2 is a perspective representation of a hoist 28 according to the prior art. The hoist 28 includes a frame 30 that is suspended from a lifting plate 32 by four cables 34, 36, 38, 40. While not shown, the lifting plate 32 is contemplated to be connected to a crane, pulley system, or other suitable lifting device that may be employed to lift items as heavy as a pylon 24.

The frame 30 includes a front bar 42, a left side bar 44, a rear bar 46, and a right side bar 48. The four bars 42, 44, 46, 48 are connected to one another to form a rectangle. While not illustrated, the four cables 34, 36, 38, 40 may be connected to the frame 30 by suitable connectors, such as eyelets. As shown, two of the cables 34, 40 connect to the right side bar 48. The remaining two cables 36, 38 attach to the left side bar 44.

An underframe 50 is connected to the frame 30. The underframe 50 is triangularly-shaped when viewed from the side, as shown in FIG. 3. The underframe 50 extends beneath the frame 30.

The underframe 50 includes a first beam 52 that connects to the frame 30 at a connection point 54 near to the front end of the left side bar 44. A second beam 56 connects to the left side bar 44 at a position intermediate to the front end and the rear end. The second beam 56 connects to the left side bar at a connection point 58. A third beam 60 connects to the frame 30 at a connection point 62. The connection point 62 is near to the front end of the right side bar 48. A fourth beam 64 connects to the right side bar 48 at a position intermediate to the front end and the rear end. In particular, the fourth beam 64 connects to the right side bar at a connection point 66.

As shown in FIG. 2, the first beam 52, the second beam 56, the third beam 60, and the fourth beam 64 each connect to the frame 30 at their respective top ends. The first beam 52 and the second beam 56 connect to one another at their bottom ends at a connection point 68. Similarly, the bottom end of third beam 60 connects to the bottom end of the fourth beam 64 at the connection point 70. A cross-beam 72 connects the connection point 68 to the connection point 70, thereby completing the underframe 50.

The frame 30 also includes a first adjustable tensioner 74 connected to the front end of the left side beam 44 at a connection point 76. A second adjustable tensioner 78 connects to the front end of the right side beam 48 at a connection point 80.

With reference to FIG. 2, the pylon 24 connects to the hoist 28 at the connection point 82, which is provided at the lower end of the first adjustable tensioner 74. The pylon 24 also connects to the lower end of the second adjustable tensioner 78 at a connection point 84. In addition, the pylon 24 connects to the underframe 50, specifically to the cross-beam 72. As should be known to those skilled in the art, the pylon 24 includes lugs (or other connectors) that permit the pylon 24 to connect to the cross-beam 72. As a result, the pylon 24 attaches to the hoist 28 at the connection points 82, 84 and also at the cross-beam 72.

Reference is now made to FIG. 3, which helps to illustrate a difficulty associated with the operation of the hoist 28.

As noted above, it is possible that different pylons 24 may have different centers of gravity, or that the same pylon 24 may have a different center of gravity at different times, depending on which systems or components are included with the pylon 24 at the given time. For example, in one instance, the pylon 24 may include a pre-cooler. In a subsequent instance, the pylon 24 may not include the pre-cooler, in which case, the center of gravity of the pylon 24 may shift either toward the front or to the rear of the frame 30 by comparison with the first instance. If the hoist 28 is configured for lifting the pylon 24 according to the parameters associated with the first instance and the pylon 20 is configured according to the second instance, the pylon 24 naturally introduces a torque on the frame 30 that is commensurate with the change in the location for the center of gravity. This torque is indicated by the arrows 86, 88.

To compensate for any changes in the center of gravity of the pylon 24, hoist operators are required to adjust the cables and/or chains 34, 36, 38, 40. As should be apparent to those skilled in the art, this process is labor intensive, time consuming, and may require additional tools which may or may not be readily available. In some instances, finding the correct positioning for the cables and/or chains 34, 36, 38, 40 requires trial-and-error positioning, which takes time and effort on behalf of maintenance or repair technicians. Accordingly, the prior art hoist 28 is not easily or quickly modified to accommodate changes in the center of gravity of the pylon 24.

Figure 4:
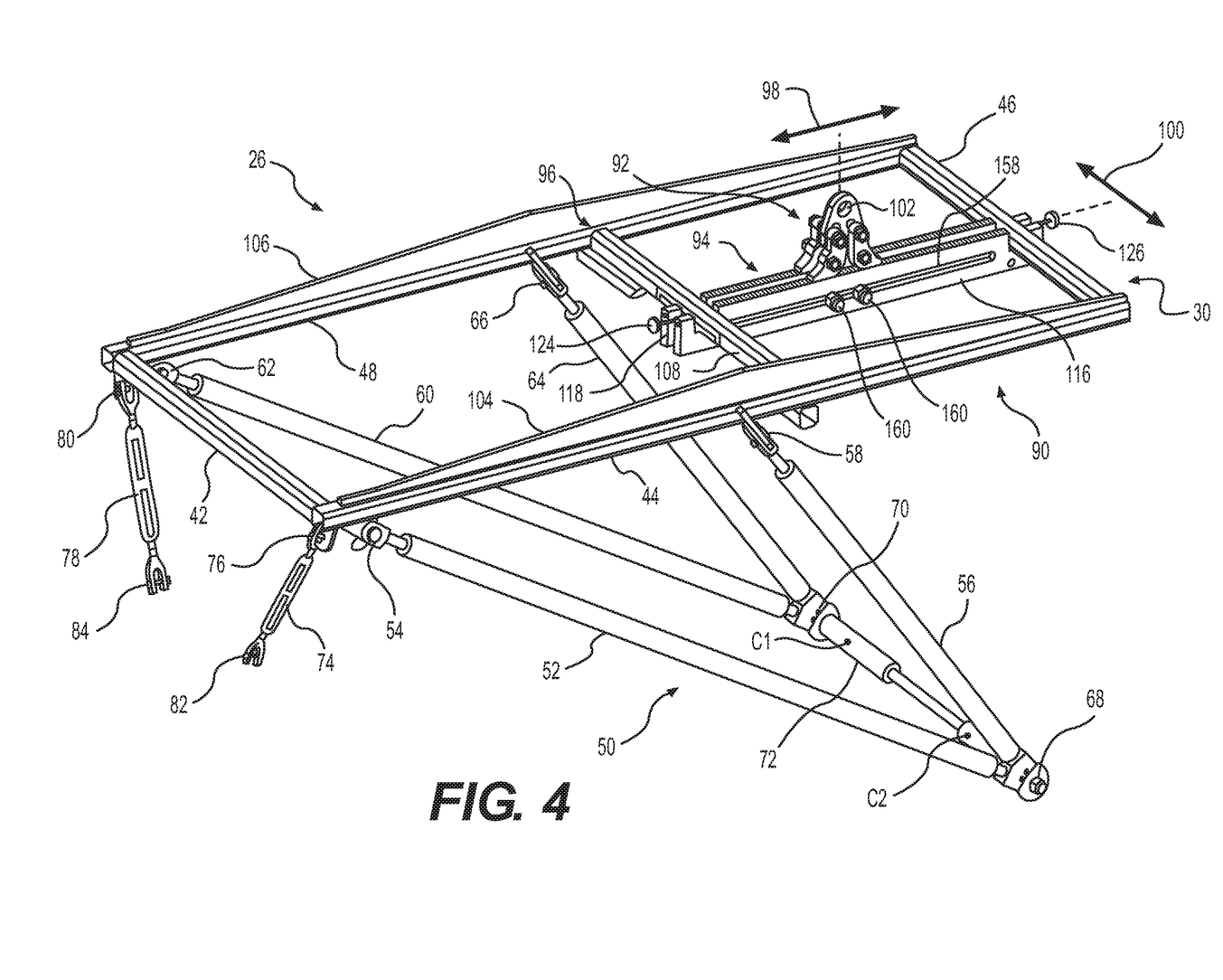
FIG. 4 is a perspective view of a hoist containing the adjustment mechanism of the present invention.

As shown in FIG. 4, the hoist 26 includes an adjustment mechanism 90 according to the present invention. Together, the hoist 26 and the adjustment mechanism 90 address, at least in part, some of the deficiencies of the prior art. Specifically, the adjustment mechanism 90 of the present invention facilitates an operation of the hoist 26 that avoids one or more of the difficulties associated with the prior art hoist 28.

As generally shown, a few of the elements of the frame 30 and underframe 50 are common to the hoist 26 and also to the prior art hoist 28. However, the hoist 26 includes more abutments than the prior art hoist 28. Accordingly, this commonality, together with any other commonality discussed herein, should not be understood to limit the scope of the present invention.

As should be apparent to those skilled in the art, the combined frame 30 and underframe 50 is intended to connect to a pylon 24 with a known configuration. Accordingly, the hoists 26, 28 share common structures for lifting the pylon 24. This includes the frame 30 and the underframe 50. The drawings reflect this commonality. It is noted that, where there are common elements shared with the prior art hoist 28, the same reference numbers are employed for the illustrations of the hoist 26. The use of the same reference numbers is not intended to limit the present invention, the breadth and scope of which is made apparent by the discussion that follows.

It is noted that, for different pylons 24, the underframe 50 may have a construction differing from the one shown. As a result, the adjustment mechanism 90 according to the present invention is not intended to be limited to hoists 26 with the construction of the frame 30 or underframe 50 shown in the drawings.

As illustrated in FIGS. 4-8, the adjustment mechanism 90 comprises three basic components: (1) a clamp 92, (2) a clamp bar 94, and, optionally, (3) a cross-bar 96. To adjust for changes in the center of gravity of the pylon 24, the adjustment mechanism 90 permits longitudinal adjustment of the location of the clamp 92, which is indicated by the arrows 98. The adjustment mechanism 90 also allows for lateral adjustment of the clamp 92, as indicated by the arrows 100. For longitudinal adjustment 98, the clamp 92 is moveable along the clamp bar 94. For lateral adjustment 100, the clamp bar 94 is moveable between the left side bar 44 and the right side bar 48.

It is contemplated that the hoist 26 will be suspended from a crane, pulley system, or other lifting device attached at the location of the eyelet 102, which is provided at the top of the clamp 92.

For the hoist 26, the entire weight of the pylon 24 is transmitted through the clamp 92. Accordingly, the stresses on the frame 30 are distributed differently on the hoist 26 than the hoist 28, which includes the four cables 34, 36, 38, 40. To make an allowance for this difference, the left side bar 44 includes a left reinforcing plate 104. Similarly, the right side bar 48 is reinforced with a right reinforcing plate 106. While the left and right reinforcing plates 104, 106 are shown as being triangular in shape, any other configuration also is contemplated to fall within the scope of the present invention.

Figure 5:
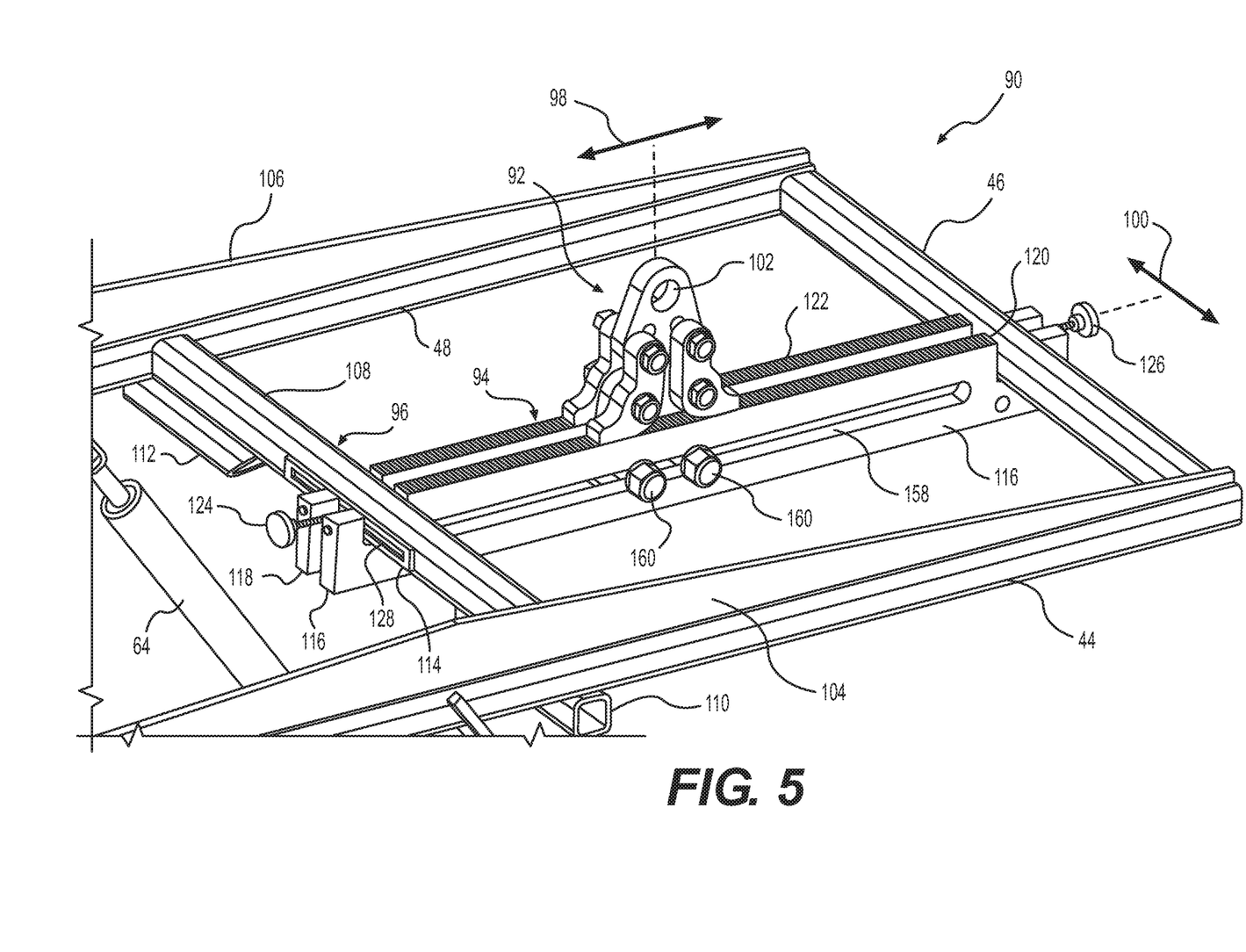
FIG. 5 is an enlarged detail of the hoist illustrated in FIG. 4, showing additional details associated with the adjustment mechanism of the present invention.

With reference to FIG. 5, the cross-bar 96 includes a central bar 108 that is aligned with and extends between the left side bar 44 and the right side bar 48. The cross-bar 96 is located at a position between the front bar 42 and the rear bar 46. As shown in FIG. 4, the cross-bar 96 is positioned closer to the rear bar 46 than the front bar 42. While it is contemplated that this location for the cross-bar 96 is desirable for some hoists 26, the exact location of the cross-bar 96 is not critical to the present invention.

The cross-bar 96 includes a central bar 108, a left connector bar 110, and a right connector bar 112. The central bar 108 is aligned to be co-planar with the front bar 42, the left side bar 44, the rear bar 46, and the right side bar 48. The left connector bar 110 attaches to the bottom of the left side bar 44 and also to the bottom of the central bar 108. The left connector bar 110 reinforces the connection of the central bar 108 to the left side bar 44. Similarly, the right connector bar 112 is attached to the bottom of the right side bar 48 and also to the bottom of the central bar 108. The right connector bar 112 reinforces the connection between the central bar 108 and the right side bar 48. The central bar 108, the left connector bar 110, and the right connector bar 112 are contemplated to be welded to the left side bar 44 and the right side bar 48, respectively.

In an alternative construction, it is contemplated that the hoist 26 may not include the left connector bar 110 or the right connector bar 112. These elements, therefore, are not required to practice the present invention.

In a further contemplated construction, the cross-bar 96 may not be provided. It is contemplated that the clamp bar 94 may extend the full length of the frame 30. In such a construction, the clamp bar 94 is contemplated to extend from the front bar 42 to the rear bar 46 of the frame 30.

The central bar 108 includes an adjustment plate 114 disposed thereon. The adjustment plate 114 may be welded onto the central bar 108. While not visible in this illustration, it is contemplated that another adjustment plate 114 also is provided on the exterior side of the rear bar 46. The adjustment plates 114 assist with adjustment of the clamp 92 in the lateral direction 100, as discussed in greater detail below.

The clamp bar 94 includes a left toothed bar 116 and a right toothed bar 118. The left and right toothed bars 116, 118 may be connected to one another and are generally parallel to one another. Together the left and right toothed bars 116, 118 support the clamp 92. A portion of the clamp 92 is disposed between and slides along the left and right toothed bars 116, 118.

The left toothed bar 116 includes a left toothed surface 120 thereon. Similarly, the right toothed bar 118 includes a right toothed surface 122 thereon. The left and right toothed surfaces 120, 122 are suitable for engaging with complimentary teeth 162 on the clamp 92 to maintain the clamp 92 at the selected longitudinal position 98 on the clamp bar 94. The operation of the clamp 92 is discussed in greater detail with respect to FIGS. 7 and 8.

The clamp bar 94 includes knobs 124, 126 at either end. The knobs 124, 126 engage grooves 128 in the adjustment plates 114 at either end of the adjustment mechanism 90. By tightening the knobs 124, 126, the clamp bar 94 is held in place along the lateral direction 100. Conversely, by loosening the knobs 124, 126, the clamp bar 94 may be moved in the lateral direction as indicated by the arrows 100.

Figure 6:
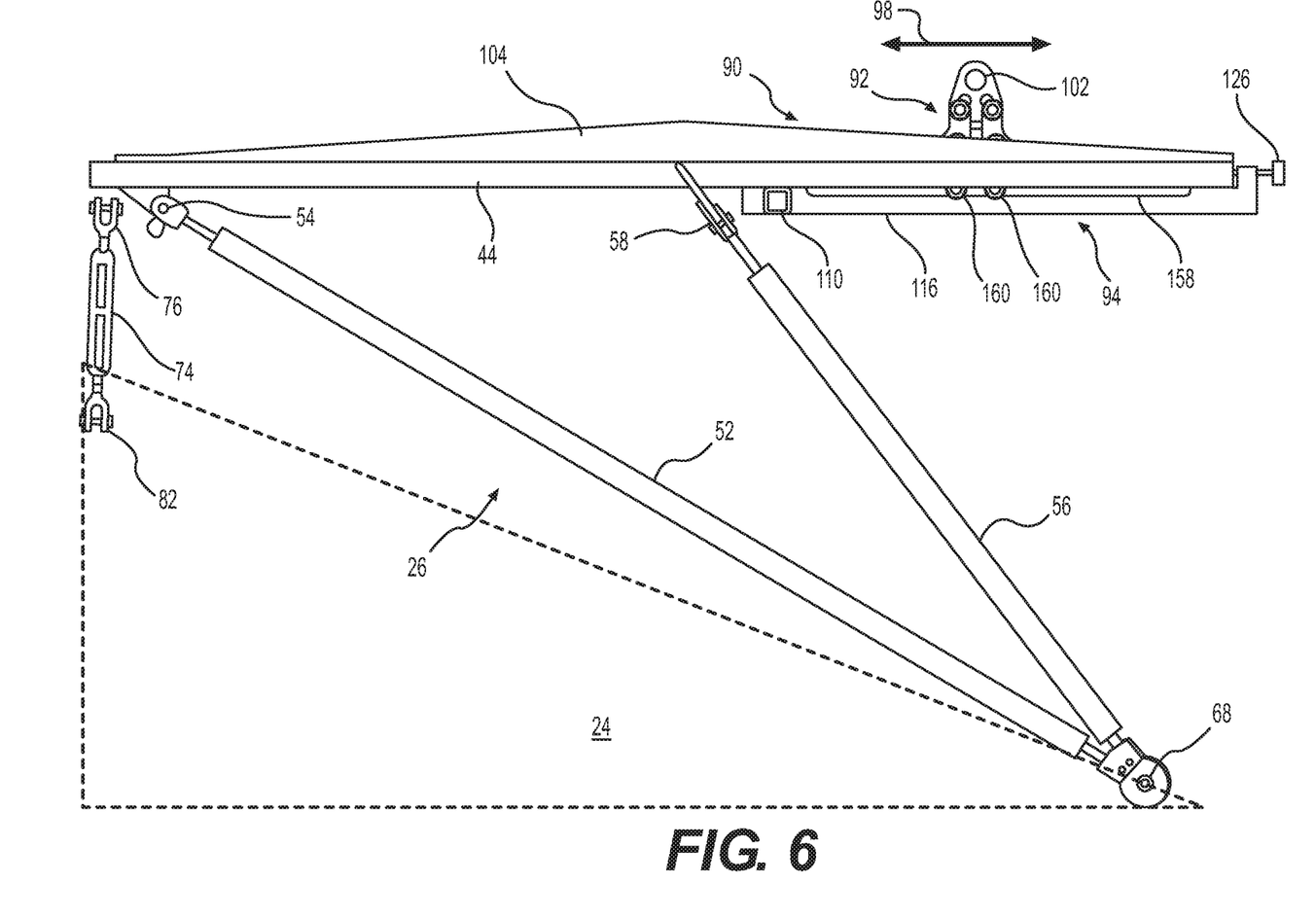
FIG. 6 is an elevational, side view illustration of the hoist illustrated in FIG. 4, providing additional details associated with the adjustment mechanism of the present invention.

FIG. 6 is an elevational, side view of the hoist 26 and adjustment mechanism 90 according to the present invention. A graphical representation of the pylon 24, in the shape of a dotted-line triangle, has been added to FIG. 6 for illustration purposes. The designation of the pylon 24 is not intended to be representative of an actual pylon 24, as should be apparent to those skilled in the art.

The construction and operation of the clamp 92 will be described in connection with FIGS. 7 and 8.

Figure 7:
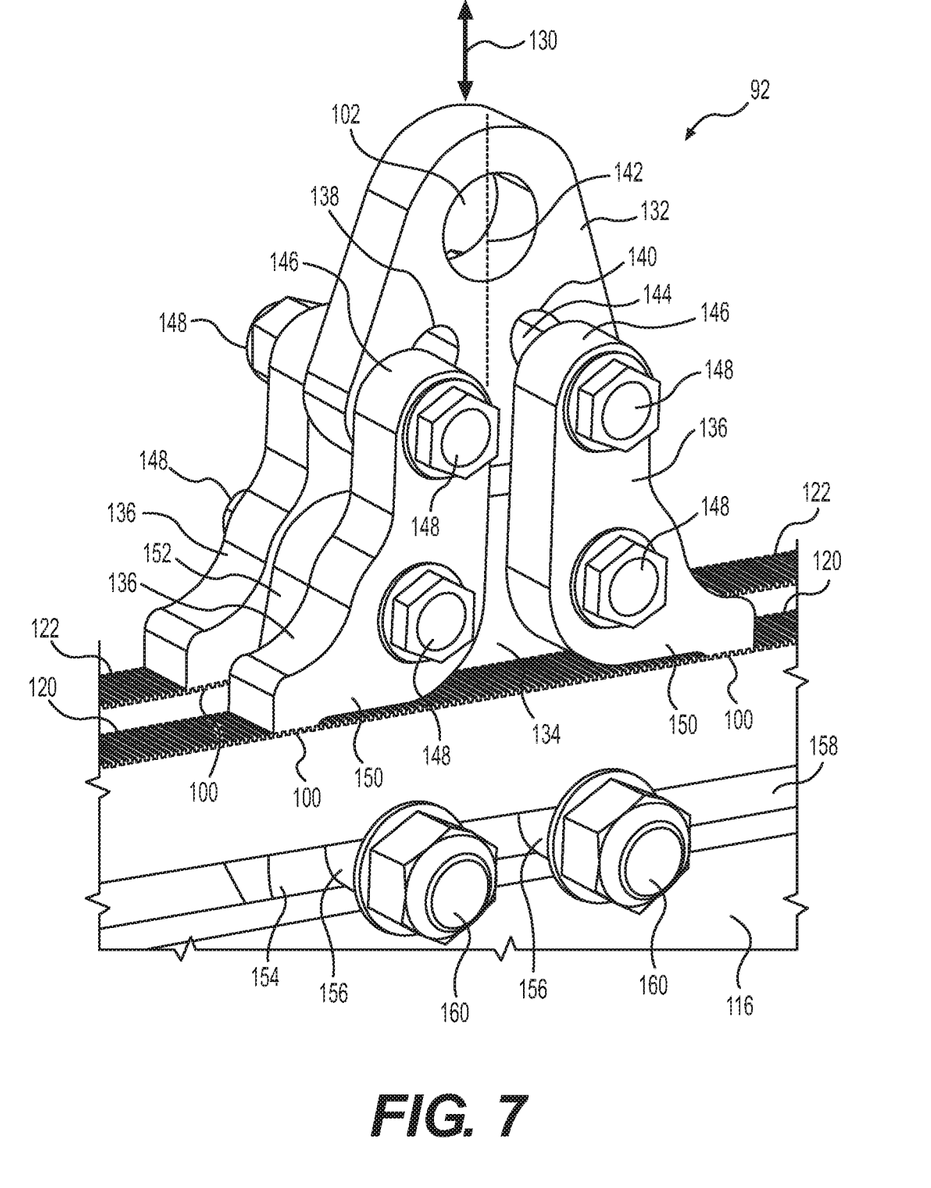
FIG. 7 is an enlarged, perspective illustration of a clamp element forming a part of the adjustment mechanism illustrated in FIG. 4, showing the clamp in a clamped or closed condition.

Referring to FIG. 7, the clamp 92 encompasses a clamp body that includes an upper clamp element 132 and a lower clamp element 134. The upper clamp element 132 connects to the lower clamp element 134 via at least one clamping member. In the illustrated embodiment, the clamping member encompasses four moveable clamping pawls 136, three of which are visible in FIGS. 7 and 8.

The upper clamp element 132 includes the eyelet 102, which permits the clamp 92 to be connected to a crane, pulley system, or other lifting device. The upper clamp element 132 may be triangular in shape and may include two, slanted slots 138, 140 (shown in FIG. 7) extending outwardly and downwardly from a central axis 142.

Upper shafts 144 extend through the upper ends 146 of the pawls 136. There are two upper shafts 144. Each upper shaft 144 connect two pawls 136 together. In the illustrated embodiment, the two pawls 136 that are connected to one another are disposed on opposite sides of the upper clamp element 132 and the lower clamp element 134. The upper shafts 144 pass through the slanted slots 138, 140 and are able to slide within the slanted slots 138, 144, such that the upper clamp element 132 and the lower clamp element 134 are movable in relation to one another. The upper shafts 144 are secured to the pawls 136 via fasteners 148.

Lower shafts connect the lower ends 150 of the pawls 136 to one another through the upper end 152 of the lower clamp element 134. There are two lower shafts. The lower shafts are not visible because they are obscured by the pawls 136 and the body of the lower clamp element 134. Each lower shaft connects two of the pawls 136 to one another. The lower shafts are secured to the pawls 136 through the lower clamp element 134 via fasteners 148.

The lower shafts are rotatably disposed in openings in the upper end 152 of the lower clamp element 134. The pawls 136 rotate around the lower shafts. This permits the upper shafts 144 to move within the slanted slots 138, 140 when the clamp 92 transitions from the clamped condition (FIG. 7) to the unclamped condition (FIG. 8), as will be described below.

The lower end 154 of the lower clamp element 134 includes two shafts 156 that pass through slots 158 in the left toothed bar 116 and the right toothed bar 118. The shafts 156 secure the lower clamp element 134 to the left and right toothed bars 116, 118 via fasteners 160. The shafts 156 permit the clamp 92 to slide along the left and right toothed bars 116, 118 when the clamp 92 is in the unclamped condition, as illustrated in FIG. 8.

Figure 8:
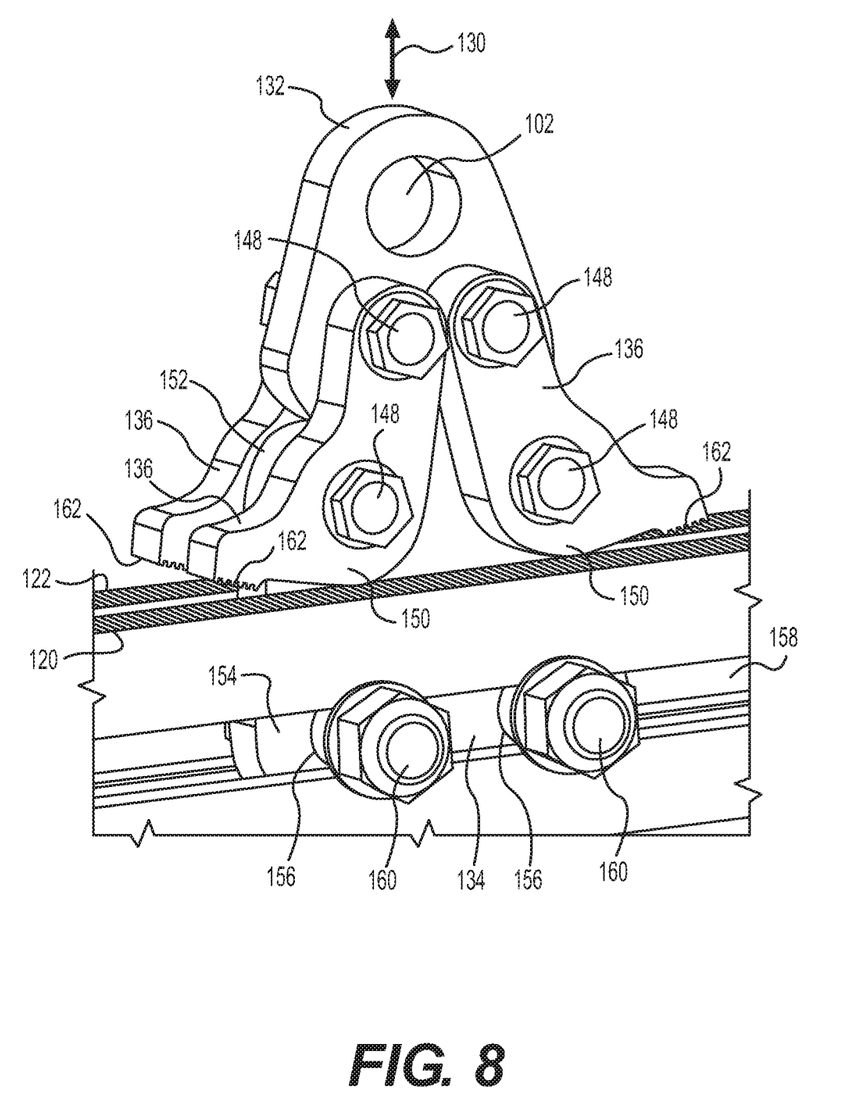
FIG. 8 is an enlarged, perspective illustration of a clamp element forming a part of the adjustment mechanism illustrated in FIG. 4, showing the clamp in an unclamped or opened condition.

As also illustrated in FIGS. 7 and 8, the lower ends 150 of the pawls 136 are provided with teeth 162 to engage the teeth on the left toothed surface 120 and the right toothed surface 122. The teeth 162 prevent movement of the clamp 92 in the longitudinal direction 98 when the clamp 92 is in the clamped condition, as illustrated in FIG. 7.

In the illustrated embodiment, the pawls 136 are shown as L-shaped elements. While the L-shaped pawls 136 are contemplated to be suitable for the adjustment mechanism 90 of the present invention, the pawls 136 may have any suitable shape without departing from the scope of the present invention.

While the present invention is described in connection with four pawls 136, the present invention should not be understood to be limited solely to such a construction. A larger number of pawls 136 or a fewer number of pawls 136 may be employed without departing from the scope of the present invention. It is contemplated that the clamp 92 will require at least one pawl 136.

Each of the elements of the adjustment mechanism 90 is contemplated to be made from a metal such as steel. However, the present invention is not limited to any particular material. Any other suitable material including, but not limited to, metals, alloys, composite materials, ceramics, etc., may be employed without departing from the scope of the present invention.

The operation of the adjustment mechanism 90 of the present invention will now be described in more detail with reference to FIGS. 7 and 8.

FIG. 7 is an illustration of the clamp 92 in a closed or clamped condition. The clamp 92 is designed to acquire the clamped condition when a force is exerted upwardly on the upper clamp element 132. More specifically, when a lifting force is exerted on the upper clamp element 132, such as via a crane, pulley system, or other lifting device connected to the eyelet 102, the clamp 92 automatically acquires the clamped condition. Therefore, the clamp 92 transitions from the unclamped or open condition to the clamped or closed condition by pulling upwardly on the clamp 92 in the direction of the arrows 130. As should be apparent to those skilled in the art, the clamp 92 cannot be disengaged until weight is removed from the clamp 92, such as to avoid movement of the clamp 92 during a lifting operation.

In the clamped condition, the upper shafts 144 move into a bottom position within the slanted slots 138, 140. The pawls 136 are shaped such that, when the upper shafts 144 move into a bottom position within the slanted slots 138, 140, the lower ends 150 of the pawls 136 engage with the toothed bars 116, 118. More specifically, in this clamped position, the teeth 162 of the pawls 136 engage the complementary teeth of the left toothed bar 116 and the right toothed bar 118. Due to the interaction of the teeth 162 of the pawls 136 with the teeth of the toothed bars 116, 118, the clamp 92 cannot move in the longitudinal direction 98. In this state, the clamp 92 is clamped onto the toothed bars 116, 118.

FIG. 8 is an illustration of the clamp 92 in an opened or unclamped condition. The clamp 92 transitions from the clamped or closed condition to the unclamped or opened condition when a lifting pressure on the clamp 92, as indicated by the arrows 130, is released. In other words, in the absence of a lifting force, the natural state for the clamp 92 is to be in the unclamped condition. In the unclamped condition, the upper shafts 144 slide into an upper position within the slanted slots 138, 140. The pawls 136 to are shaped such that when the upper shafts 144 move into an upper position within the slanted slots 138, 140, the pawls 136 rotate about the lower shafts for causing the lower ends 150 of the pawls 136 to disengage from the toothed bars 116, 118. As a result, the clamp 92 is free to be moved by an operator to any position along the clamp bar 94. This allows for the quick release of the clamp 92 from the toothed bars 116, 118 when the lifting force is released from the upper clamp element 132. It also allows the clamp 92 to be easily slid along the longitudinal direction 98 of the toothed bars 116, 118 for permitting a relatively simple, and tool-free way of adjusting the positioning of the clamp 92 in order to compensate for a change in the center of gravity of the object being lifted.

Taking the foregoing into consideration, those skilled in the art may appreciate that the hoist 26 and adjustment mechanism 90 of the present invention offer a number of features that are absent from the prior art hoist 28. For example, the hoist 26 may be quickly reconfigured to accommodate for a wide variety of centers of gravity for the pylon 24. As a result, there are considerable time savings associated with the use of the hoist 26. In addition, tooling is not needed to adjust the position of the clamp 92, since the position of the clamp 92, both longitudinally 98 and laterally 100, may be changed by hand. Still further aspects and advantages should be apparent to those skilled in the art.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An adjustment mechanism for a lifting device, the adjustment mechanism comprising:
 a longitudinal clamp bar; and
 a clamp slidably disposed on the clamp bar, the clamp comprising:
  a clamp body; and
  at least one clamping member movably connected to the clamp body, the at least one clamping member being operative for:
   acquiring a clamped condition when a lifting force is applied to the clamp body, wherein in the clamped condition, the at least one clamping member is engaged with the longitudinal clamp bar to prevent movement of the clamp along the clamp bar; and
   acquiring an unclamped condition when the lifting force is released from the clamp body, wherein in the unclamped condition, the clamp is free to move along the clamp bar;
 wherein the clamp body comprises an upper clamp element and a lower clamp element movable in relation to each other; and
 wherein the upper clamp element comprises two slots and the at least one clamping member comprises four pawls.

2. The adjustment mechanism of claim 1, wherein the two slots receive respective parts of the at least one clamping member.

3. The adjustment mechanism of claim 2, wherein the at least one clamping member is movable in relation to the upper clamp element via the two slots.

4. The adjustment mechanism of claim 3, wherein the longitudinal clamp bar comprises a plurality of teeth and the four pawls comprise corresponding teeth, wherein in the clamped condition, the teeth of the four pawls engage with the teeth of the longitudinal clamping bar.

5. The adjustment mechanism of claim 1, wherein the clamp bar comprises a left clamp bar and a right clamp bar disposed on opposite sides of the upper clamp element and the lower clamp element.

6. The adjustment mechanism of claim 5, wherein:
 the four pawls are arranged in pairs disposed on the opposite sides of the upper clamp element and the lower clamp element;
 a first pair of the pawls engages the left clamp bar; and
 a second pair of the pawls engages the right clamp bar.

7. The adjustment mechanism of claim 6, wherein:
the left clamp bar comprises a left toothed surface;
the right clamp bar comprises a right toothed surface; and
the four pawls comprise teeth complimentary to the left toothed surface and the right toothed surface.

8. The adjustment mechanism of claim 7, wherein:
the upper clamp element defines an eyelet for engaging a lifting device;
the two slots are slanted slots;
a first shaft is slidably disposed in each slanted slot, connecting upper ends of two of the pawls together on opposite sides of the upper clamp element;
the lower clamp element defines two upper openings at an upper end; and
a second shaft is rotatably disposed in each opening, connecting lower ends of the two of the pawls together on opposite sides of the lower clamp element.

9. The adjustment mechanism of claim 8, wherein:
the left and right clamp bars define grooves therein;
the lower clamp element defines two lower openings at a lower end; and
a third shaft is disposed in each lower opening, wherein the third shaft extends into the grooves, thereby slidably securing the clamp to the left and right clamp bars.

10. The adjustment mechanism of claim 1, further comprising:
a knob disposed on the clamp bar that secures the clamp bar against movement in a lateral direction.

11. A hoist, comprising:
a frame; and
an adjustment mechanism disposed on the frame comprising:
a longitudinal clamp bar; and
a clamp slidably disposed on the clamp bar, the clamp comprising:
a clamp body; and
at least one clamping member movably connected to the clamp body, the at least one clamping member being operative for:
acquiring a clamped condition when a lifting force is applied to the clamp body, wherein in the clamped condition, the at least one clamping member is engaged with the longitudinal clamp bar to prevent movement of the clamp along the clamp bar; and
acquiring an unclamped condition when the lifting force is released from the clamp body, wherein in the unclamped condition, the clamp is free to move along the clamp bar.

12. The hoist of claim 11, wherein the clamp body comprises an upper clamp element and a lower clamp element movable in relation to each other.

13. The hoist of claim 12, wherein the upper clamp element comprises a slot for receiving the at least one clamping member.

14. The hoist of claim 13, wherein the at least one clamping member comprises a pawl movable in relation to the upper clamp element via the slot.

15. The hoist of claim 14, wherein the longitudinal clamp bar comprises a plurality of teeth and the at least one pawl comprises corresponding teeth, wherein in the clamped condition, the teeth of the at least one pawl engage with the teeth of the longitudinal clamping bar.

16. The hoist of claim 12, wherein the upper clamp element comprises two slots and the at least one clamping member comprises four pawls.

17. The hoist of claim 12, wherein the clamp bar comprises a left clamp bar and a right clamp bar disposed on opposite sides of the upper clamp element and the lower clamp element.

18. The hoist of claim 17, wherein:
the at least one clamping member comprises four pawls;
the four pawls are arranged in pairs disposed on the opposite sides of the upper clamp element and the lower clamp element;
a first pair of the pawls engages the left clamp bar; and
a second pair of the pawls engages the right clamp bar.

19. The hoist of claim 18, wherein:
the left clamp bar comprises a left toothed surface;
the right clamp bar comprises a right toothed surface; and
the four pawls comprise teeth complimentary to the left toothed surface and the right toothed surface.

20. The hoist of claim 18, wherein:
the upper clamp element defines an eyelet for engaging a lifting device;
the upper clamp element defines two slanted slots;
a first shaft is slidably disposed in each slanted slot, connecting upper ends of two pawls together on opposite sides of the upper clamp element;
the lower clamp element defines two upper openings at an upper end; and
a second shaft is rotatably disposed in each opening, connecting lower ends of the two pawls together on opposite sides of the lower clamp element.

21. The hoist of claim 20, wherein:
the left and right clamp bars define grooves therein;
the lower clamp element defines two lower openings at a lower end; and
a third shaft is disposed in each lower opening, wherein the third shaft extends into the grooves, thereby slidably securing the clamp to the left and right clamp bars.

22. The hoist of claim 11, further comprising:
a knob disposed on the clamp bar that secures the clamp bar against movement in a lateral direction.

* * * * *